(12) United States Patent
Hatscher et al.

(10) Patent No.: US 7,519,919 B2
(45) Date of Patent: Apr. 14, 2009

(54) METHODS AND SYSTEMS FOR INPUTTING DATA INTO A COMPUTER SYSTEM

(75) Inventors: Michael Hatscher, Osnabruck (DE); Joerg Beringer, Frankfurt (DE)

(73) Assignee: SAP AG, Walldorf (DE)

( * ) Notice: Subject to any disclaimer, the term of this patent is extended or adjusted under 35 U.S.C. 154(b) by 614 days.

(21) Appl. No.: 10/846,670

(22) Filed: May 17, 2004

(65) Prior Publication Data

US 2005/0022126 A1 Jan. 27, 2005

(30) Foreign Application Priority Data

May 16, 2003 (EP) ................................. 03011203
Oct. 17, 2003 (EP) ................................. 03078285

(51) Int. Cl.
*G06F 3/048* (2006.01)
*G06F 3/00* (2006.01)

(52) U.S. Cl. .................. 715/780; 715/224; 715/225; 715/226; 715/708

(58) Field of Classification Search ............... 715/507, 715/508, 792, 744, 780, 829, 845, 906, 224, 715/225, 768, 837, 851; 719/329; 714/57
See application file for complete search history.

(56) References Cited

U.S. PATENT DOCUMENTS

| | | | | |
|---|---|---|---|---|
| 5,659,694 A * | 8/1997 | Bibayan | ...................... | 715/788 |
| 5,760,774 A * | 6/1998 | Grossman et al. | ........... | 715/835 |
| 5,768,581 A * | 6/1998 | Cochran | ......................... | 707/5 |
| 5,781,193 A * | 7/1998 | Alimpich et al. | ............. | 715/810 |
| 5,949,417 A * | 9/1999 | Calder | ........................ | 715/788 |
| 5,956,709 A * | 9/1999 | Xue | ................. | 707/3 |
| 5,963,938 A * | 10/1999 | Wilson et al. | .................. | 707/4 |
| 5,986,654 A * | 11/1999 | Alexander et al. | .......... | 715/744 |
| 6,137,488 A * | 10/2000 | Kraft et al. | ................... | 715/866 |
| 6,243,699 B1 * | 6/2001 | Fish | ............................... | 707/2 |
| 6,256,623 B1 * | 7/2001 | Jones | ............................ | 707/3 |
| 6,311,194 B1 * | 10/2001 | Sheth et al. | .................. | 715/505 |
| 6,345,273 B1 * | 2/2002 | Cochran | ......................... | 707/4 |
| 6,407,759 B1 * | 6/2002 | Kanungo et al. | ............ | 715/809 |
| 6,407,760 B1 * | 6/2002 | Aritomi | ...................... | 715/810 |
| 6,574,625 B1 * | 6/2003 | Bates et al. | ..................... | 707/5 |
| 6,594,670 B1 * | 7/2003 | Genser | ....................... | 707/102 |
| 6,609,146 B1 * | 8/2003 | Slotznick | ..................... | 709/200 |
| 6,625,609 B1 * | 9/2003 | McDade et al. | ............. | 707/102 |
| 6,633,310 B1 * | 10/2003 | Andrew et al. | .............. | 715/728 |
| 6,651,217 B1 * | 11/2003 | Kennedy et al. | ............ | 715/224 |
| 6,658,406 B1 * | 12/2003 | Mazner et al. | .................. | 707/3 |
| 6,801,230 B2 * | 10/2004 | Driskell | ...................... | 715/854 |
| 6,810,414 B1 * | 10/2004 | Brittain | ....................... | 709/219 |
| 6,826,566 B2 * | 11/2004 | Lewak et al. | .................... | 707/4 |
| 6,901,556 B2 * | 5/2005 | Bosma et al. | ............... | 715/769 |
| 6,996,778 B2 * | 2/2006 | Rajarajan et al. | ............ | 715/734 |

(Continued)

*Primary Examiner*—Steven B Theriault
(74) *Attorney, Agent, or Firm*—Finnegan, Henderson Farabow, Garrett & Dunner, LLP

(57) ABSTRACT

A computer system includes a user-interface. The user-interface includes a graphical program interface with one or more input controls. The input controls are arranged for inputting data into the computer system. The graphical program interface also includes a graphical selection interface. The graphical selection interface includes one or more select controls that are arranged for selecting data suitable to be inputted by selected input controls and for inputting the selected data in the selected input control as input data.

7 Claims, 3 Drawing Sheets

U.S. PATENT DOCUMENTS

| | | | |
|---|---|---|---|
| 7,010,751 B2* | 3/2006 | Shneiderman | 715/764 |
| 7,039,684 B2* | 5/2006 | Blockton et al. | 709/213 |
| 7,194,695 B1* | 3/2007 | Racine et al. | 715/780 |
| 7,216,305 B1* | 5/2007 | Jaeger | 715/849 |
| 7,263,670 B2* | 8/2007 | Rekimoto | 715/837 |
| 7,278,113 B1* | 10/2007 | Racine et al. | 715/780 |
| 2002/0029232 A1* | 3/2002 | Bobrow et al. | 707/517 |
| 2002/0069122 A1* | 6/2002 | Yun et al. | 705/26 |
| 2002/0101450 A1* | 8/2002 | Magendanz et al. | 345/764 |
| 2002/0105548 A1* | 8/2002 | Hayton et al. | 345/764 |
| 2002/0120679 A1* | 8/2002 | Hayton et al. | 709/203 |
| 2002/0154166 A1* | 10/2002 | Sanders et al. | 345/764 |
| 2003/0005413 A1* | 1/2003 | Beer et al. | 717/125 |
| 2003/0023641 A1* | 1/2003 | Gorman et al. | 707/530 |
| 2003/0028792 A1* | 2/2003 | Plow et al. | 713/193 |
| 2003/0110445 A1* | 6/2003 | Khaleque | 715/505 |
| 2003/0126555 A1* | 7/2003 | Aggarwal et al. | 715/505 |
| 2004/0030710 A1* | 2/2004 | Shadle | 707/102 |
| 2004/0039991 A1* | 2/2004 | Hopkins et al. | 715/507 |
| 2004/0128183 A1* | 7/2004 | Challey et al. | 705/10 |
| 2004/0199491 A1* | 10/2004 | Bhatt | 707/2 |
| 2004/0199494 A1* | 10/2004 | Bhatt | 707/3 |
| 2004/0230947 A1* | 11/2004 | Bales et al. | 717/110 |
| 2004/0268260 A1* | 12/2004 | Rockey et al. | 715/708 |
| 2005/0005248 A1* | 1/2005 | Rockey et al. | 715/853 |
| 2005/0251748 A1* | 11/2005 | Gusmorino et al. | 715/713 |
| 2007/0250841 A1* | 10/2007 | Scahill et al. | 719/320 |

* cited by examiner

METHODS AND SYSTEMS FOR INPUTTING DATA INTO A COMPUTER SYSTEM

This application is based upon and claims the benefit of priority from prior patent application EP 03011203.1 filed May 16, 2003, and prior patent application EP 03078285.8, filed Oct. 17, 2003, the entire contents of each which are expressly incorporated herein by reference.

BACKGROUND

I. Technical Field

The present invention relates to methods and systems for inputting data in a computer system.

II. Background Information

Computer systems, when executing a computer program, may provide a user-interface. The user interface may include a graphical program interface that is part of the executing computer program. The graphical program interface has one or more input controls for a user to input data into the computer system. In such a system, the user-interface also may include a control for a user to open another graphical interface, such as a context sensitive menu located outside the graphical program interface. Such a context sensitive menu is often referred to as a pop-up menu. In the pop-up menu, information about the selected input control may be shown or data may be presented to the user that is suitable to be inserted at a selected input control. A pop-up menu of this type is also known in the art as a context-sensitive menu because it displays information relating to the selected input control or data suitable to be input at the selected input control.

However, the pop-up menu is inconvenient because it inhibits the user from using the program interface. In other words, the user cannot use the program interface unless he closes the pop-up menu. Furthermore, the pop-up menu is inconvenient because the pop-up menu may obscure a part of the graphical program interface. This is especially the case when a large amount of data is suitable to be inserted at the input control and the pop-up menu has relatively large dimensions. Another inconvenient aspect is that the pop-up menu may obscure the input control, which prevents the user from viewing the input control and thus prevents the user from determining what type of data should be inserted at the input control.

SUMMARY

A computer system is made easier to use because a graphical selection interface is part of the graphical program interface. As a result, the graphical selection interface does not inhibit a user from accessing other parts of the graphical program interface, such as the selected input control. In addition, a user may use other parts of the graphical program interface without being required to close the graphical selection interface. Furthermore, the graphical selection interface is part of the graphical program interface. Consequentially, the graphical selection interface may be arranged such that it does not obscure the other parts of the graphical program interface.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
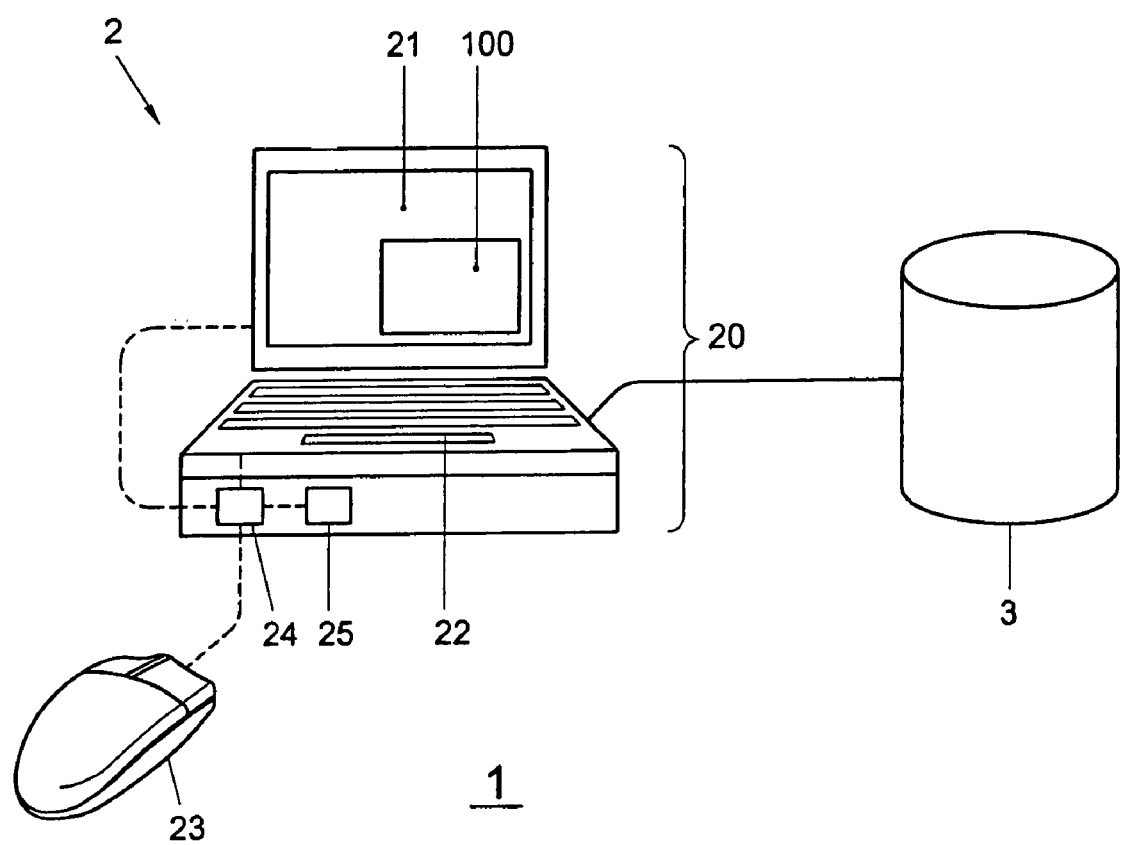
FIG. 1 shows an exemplary embodiment of a computer system according to the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

As shown in FIG. 1, a computer system 1 includes a computer device 2. Computer system 1 also includes a database 3 which may, for example, store information about persons working in a company, for example. In the example shown in FIG. 1, computer device 2 and database 3 are separate entities and computer device 2 is communicatively connected to database 3. However, database 3 may instead be a part of computer device 2.

Referring to FIG. 1, computer device 2 has a user-interface (UI) 20, which in this example includes an output interface, such as display 21, at which data can be outputted in a perceptible form to a user. Display 21 displays information 26 providing a graphical user interface (GUI). User-interface 20 also includes an input interface, such as a keyboard 22 and a mouse 23, at which the user can input data into computer device 2.

Both the output interface and the input interface may comprise other components than those depicted in FIG. 1, such as for example an electronic writing pad, acoustic output, or input devices. Further, the input and output interface may at least partially be integrated in the same device, such as in a touch screen.

Computer system 2 also includes a processor 24 that is communicatively connected to display 21, keyboard 22, mouse 23, and to a memory 25, as is indicated by the dashed lines shown in FIG. 1. Processor 24 is arranged to handle input from the input interface, and output data at display 21. Processor 24 may also include other functionality, such as an ability to handle data received or outputted to another device, manipulating data, or executing one or more computer programs stored in memory 25.

Actions performed by a user by means of keyboard 22 and mouse 23 are graphically represented at the GUI by computer device 2. Accordingly, in this example, when a user performs actions at the GUI, the actions are performed by means of keyboard 22 and mouse 23, but are graphically represented at the GUI. However, it is also possible to combine the GUI and the input interface, for example as a touch-screen. In such an arrangement, actions performed by a user at the GUI are both represented and performed at the GUI.

As shown in FIG. 1, user-interface 20 includes a graphical program interface 100, which is a visual representation shown on display 21 of at least a part of a computer program running on computer device 2. Graphical program interface 100 may, for example, provide access to a user at a node in a computer network to resources stored on a server in the network. Graphical program interface 100 may also be a graphical representation of a web-browser program that allows access to resources, such as applications, data and services of a computerized enterprise management system, such as that provided by SAP AG of Waldorf, Germany.

Figure 2:
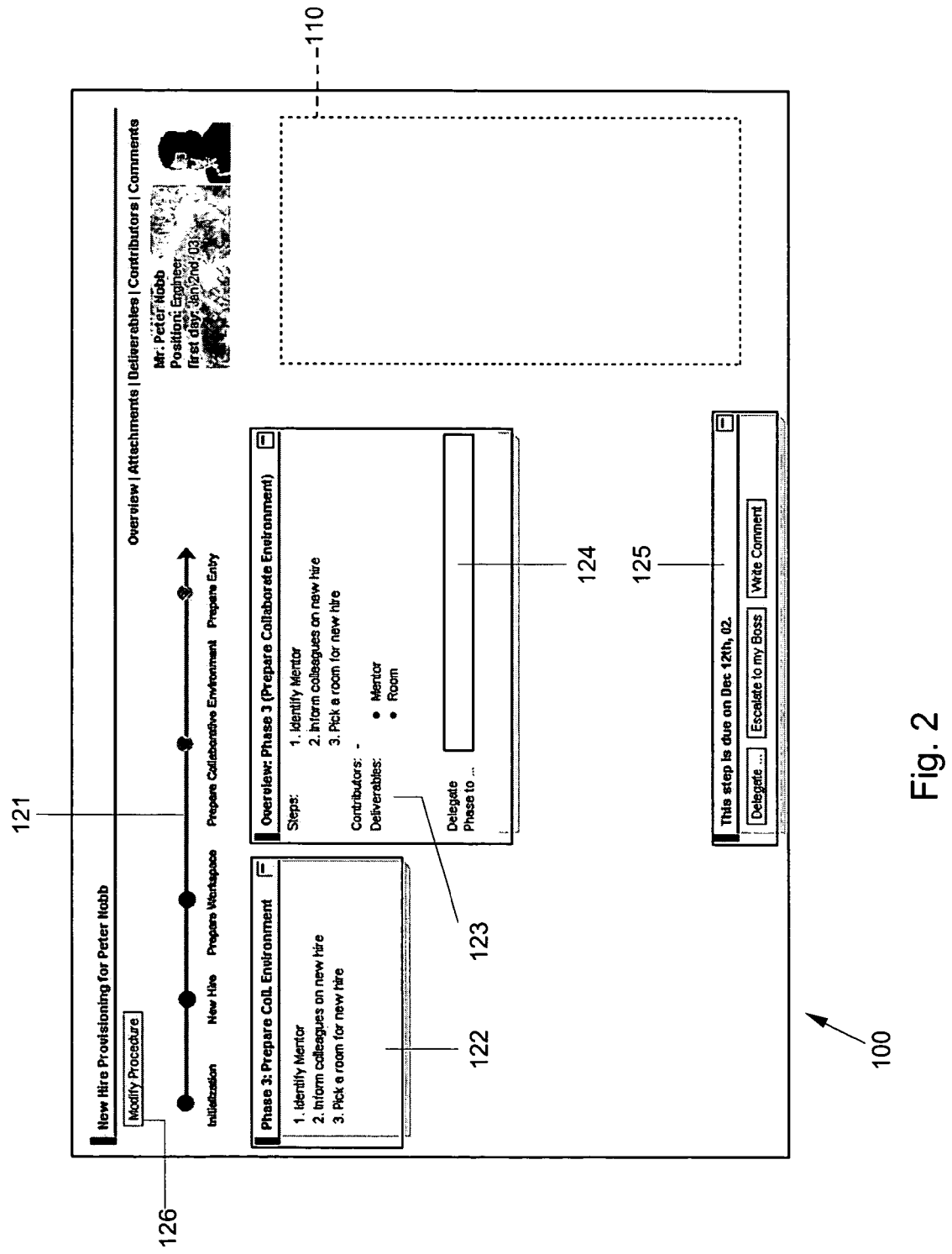
FIGS. 2 and 3 show an exemplary embodiment of a graphical user-interface suitable for use in the computer system shown in FIG. 1.
Figure 3:
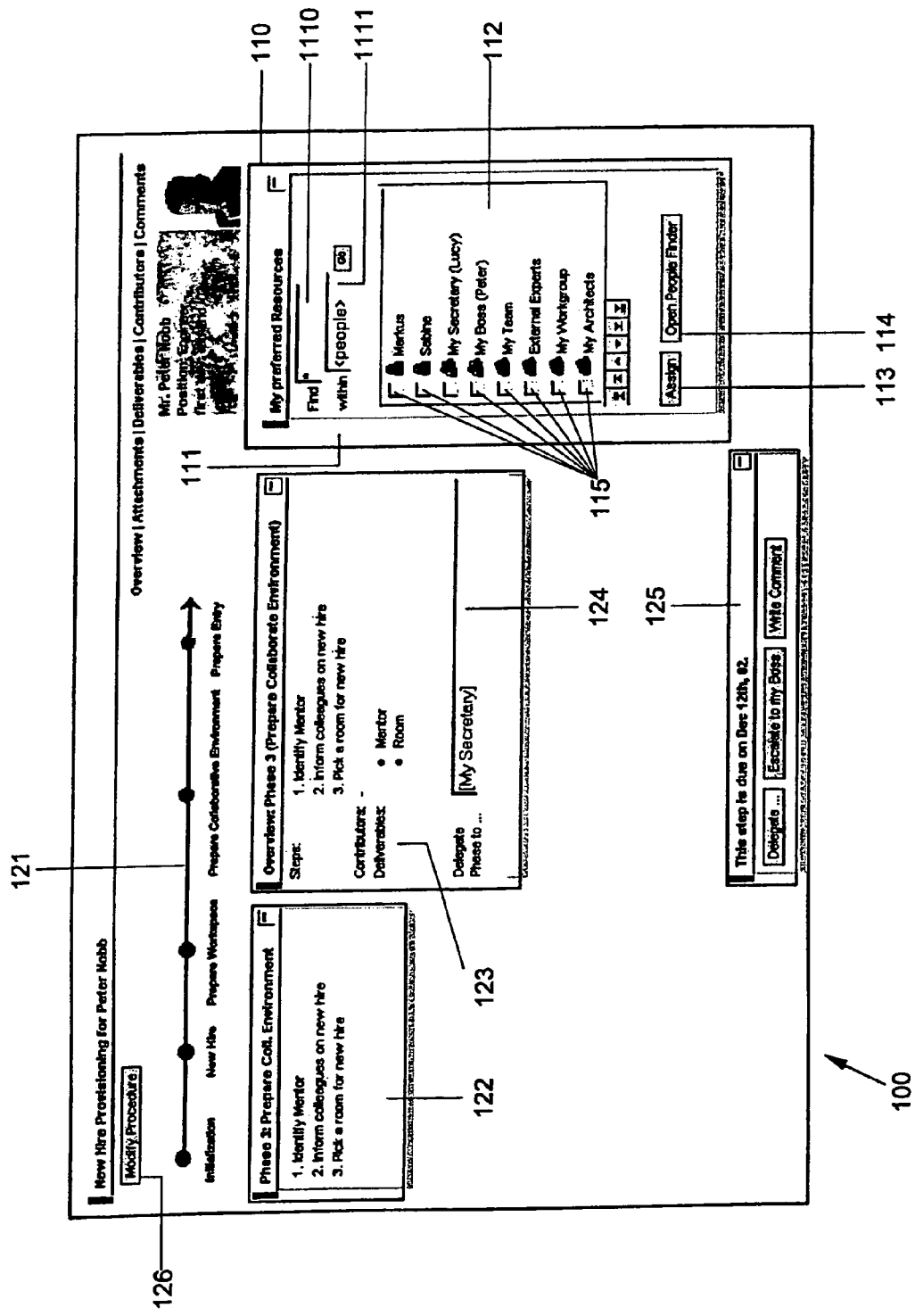

As shown in FIGS. 2-3, graphical program interface 100 includes several sub-interfaces 110, 122, 124, 125, as explained below in more detail. The sub-interface denoted with reference number 110 is a graphical selection interface. Graphical selection interface 110 can interact with one or more input controls in graphical program interface 100, such as delegate control 124 in sub-interface 123.

In the example, graphical selection interface 110 is part of graphical program interface 100. A user can use graphical program interface 100 without closing graphical selection interface 110. Accordingly, the computer system is easier to use. Furthermore, graphical selection interface 110 cannot obscure graphical program interface 100 because it is a part thereof, which also improves its ease of use. In this example, the position of graphical selection interface 110 is fixed with respect to graphical program interface 100. However, if so desired, graphical selection interface 110 may be movable within graphical program interface 100.

As shown in FIG. 2, in a normal state graphical selection interface 110 is not visible at graphical program interface 100, but when an input control in graphical program interface 100 is activated by a user, for example by pointing mouse 23 to the input control and pressing a button, graphical selection interface 110 becomes visible in graphical program interface 100 by computer device 2, as seen in FIG. 3. Thus, graphical selection interface 110 becomes visible only when needed to further improve ease of use.

In FIG. 3, graphical program interface 100 is shown in an input state in which a user has activated an input control, in this example a delegate control 124 by means of which the user can assign a task to a person. Graphical selection interface 110 is made visible when the input control is activated and data suitable for input at the activated input control is shown to a user.

In this example, in graphical selection interface 110, context sensitive data associated with the activated input control is displayed by means of the following process. However, the invention is not limited to this specific process and context sensitive data may also be displayed by means of a different process.

When the user activates an input control, input property data representing one or more properties of the activated or selected input control is automatically transmitted to processor 24. Processor 24 selects input associated data from the database 3 that is associated with one or more of the properties of the input control and that is suitable to be inserted at the input control. Selected input associated data is then transmitted to graphical selection interface 110. At graphical selection interface 110, the selected input associated data is outputted visually, such as by graphical selection interface 110, which includes a result field 112 in which the selected input associated data is displayed. Data suitable for input at the input control is thus searched and displayed in graphical selection interface 110 and the ease of use is improved.

It is also possible that one or more lists of suitable data are stored in memory 25, the data having been pre-selected by a user. For example, the list may contain favorite data, for a specific input field or a type of input field. When an input control is activated, a property of the selected control is sent to processor 24. Processor 24 selects a suitable list and outputs the data in the list in graphical selection interface 110. Accordingly, after activation of an input control, initially a user is presented with data that the user previously found suitable to be inserted in the input control by, which is convenient to the user.

Graphical selection interface 110 further has select controls 115 that a user may use to select data to be inputted at the activated or selected input controls in graphical program interface 100. Graphical selection interface 110 includes "Assign" control 113 via which the selected data can be inserted in one or more of the activated input controls. For example, in FIG. 3 the item "My Secretary (Lucy)" may be selected. Via Assign control 113, the user can insert the selected results in an input control. Thus, as shown in FIG. 3, the user selects an identifier of a person to which a task is delegated and inserts the identifier in delegate control 124 to assign the task to this person.

Such a computer system in this example is convenient to use because of the combination of at least the following features. First, the graphical selection interface provides a data look-up tool that can assist a user with entering data into electronic input fields. In addition, graphical selection interface 110 has the ability to adapt the data that can be inserted in the input control to the context of the activated input control. The system can react to the context of an input control by using a predetermined search query associated with a property of the activated input control. The user-defined list of favorite data provides an ability to react to the specific user.

Furthermore, graphical selection interface 110 allows a user to select input data in a step-wise approach in which the data is presented to the user in a convenient and comprehensible manner. A user may first search for suitable data in the predetermined list of favorite data, and then, if the favorite data is not suitable, perform a quick search for other data that can be inserted in the activated input control provided by means of search control 111. If the quick search does not provide suitable data, the user can perform an advanced search using extensive search control 114. When the user activates the extensive search control, a search program executing outside of the running program represented by means of the graphical program interface 100, is started by processor 24. The search program is represented in the GUI as a search program interface, by means of which a user can perform an extensive search for suitable data.

Graphical program interface 110 includes search control 111 via which, in addition to the process which is performed by processor 24, a user can perform a user-controlled search in database 3 for data corresponding to search criteria input specified by the user at search control 111. The results of the search are then displayed in result field 112. The user can select one or more of the displayed results by means of select controls 115 and Assign control 113.

In this example, processor 24 receives properties of the input control when an input control is activated and selects a predetermined search query associated with one or more of the properties from memory 25. This search query is then automatically inserted in search control 111 and used to select data suitable to be inserted in the activated input control. Thus, both the means for automatically searching and the means for manually searching for data suitable to be inserted in the activated input control are combined.

In this example, search control 111 includes find control 1110 via which a user can insert a text string that is present in the searched data. The search control further includes type control 1111. The user can specify by means of type control 1111 that the data has must be of a certain type that corresponds to the type of data to be inserted in the input control. Accordingly, in the example shown in FIG. 3, only data of the type 'people' is presented in result field 112 and thus only people data can be inserted in delegate control 124. If, however, the input control requires another type of data, such as types of cars or available room categories, the user can select in type control 1111 the corresponding data type. As a result, only data of those types are then presented in result field 112.

Additionally, graphical selection interface 110 has a extensive search control 114, "open people finder," by means of which a user can activate a program outside graphical program interface 100 with more extensive search capabilities.

In this example, graphical program interface 100 in FIG. 3 is part of a computer program that, when running on computer device 2, guides the user through the steps of a process, such as a task to be performed by the user or steps to be performed by computer system 1 under control of an operator. In this example, the procedure described is the hiring of a new employee. Graphical program interface 100 comprises a phase control 121 in which different phases of the process are depicted. The user can select a phase in phase control 121. In response to the selection of a phase, steps to be taken in that phase are shown in a phase interface 122. Accordingly, in the example shown in FIGS. 2-3, the step 'prepare collaborative environment' is selected and in reaction to its selection, steps 'identify mentor', 'inform colleagues' and 'pick a room' are shown in phase interface 122. The user may select a step shown in phase interface 122, in response to which in overview interface 123 an overview of the selected step is shown.

As is shown in FIG. 3, overview interface 123 is provided with delegate control 124 via which the user can select a person to which the whole phase or a specific step can be delegated. Graphical program interface 100 is further provided with modify control 126 via which a user can modify the procedure or a part thereof. Further, an interface 125 is present via which the user can inform his superior, write a comment or confirm that the step of a phase is delegated via suitable controls.

The example of FIGS. 2 and 3 illustrates hiring a new employee. However, graphical program interface 100 may also be used to guide a user through a different procedure, such as connecting computers in a computer network and configuring a server for the computer, or installing and optimizing new computer software on computer system 1. Phase control 121 may then, for example, show steps to be performed by a computer system under control of an operator. The operator may initiate performing the steps via phase control 121. For example, the steps may be to find a computer connected to a network server, install software from the server onto the server and configure the settings of the computer to allow access by certain users or otherwise. In the overview control settings of each step may then be shown, such that only pre-selected software is installed.

The computational aspects described here can be implemented in digital electronic circuitry; in computer hardware, firmware, software; or in combinations. Where appropriate, aspects of these systems and techniques can be implemented in a computer program product tangibly embodied in a machine-readable storage device for execution by a programmable processor, and method steps may be performed by a programmable processor that executes instructions to perform functions by operating on input data and generating output.

To provide for interaction with a user, a computer system may include a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention may also be implemented in an article of manufacture with a computer usable medium having computer readable instructions embodied therein for providing access to resources available on that computer, the computer readable instructions comprising instructions to cause the computer to perform the steps of a method according to the invention. The invention may also be implemented as a computer program for running on a computer system, at least including code portions for performing steps of a method according to the invention when run on a computer system or enabling a general propose computer system to perform functions of a filter device according to the invention. Such a computer program may be provided on a data carrier, such as a CD-ROM or diskette, stored with data loadable in a memory of a computer system, the data representing the computer program. The data carrier may further be a data connection, such as a telephone cable or a wireless connection transmitting signals representing a computer program according to the invention.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer device comprising:
   a user interface executing on the computer device, wherein the user interface comprises:
   a graphical program interface comprising a text input field for receiving a user selection, and
   a graphical selection interface displayed within the graphical program interface upon the user selection of the text input field, wherein the text input field is free from obstruction by the graphical selection interface, the graphical selection interface including:
   a search control configured to search for data choices,
   a results field for displaying the data choices after the search, and
   a select control configured to receive a selection of one of the data choices and to input the selected data choice in the text input field;

a processor communicatively connected to the graphical program interface and executing instructions to:
automatically determine at least one predetermined property of the text input field in response to the user selection of the text input field;
generate search criteria based on the at least one predetermined property;
search, with the search control and the search criteria, for the data choices;
display the data choices at the results field of the graphical selection interface.

2. The computer device of claim 1, wherein the search control comprises a type control for selecting a data type corresponding to a data type to be inputted at the text input field and wherein only data is displayed in the result field, which corresponds to the selected data type.

3. The computer device of claim 1, wherein searching for the data choices comprises:
selecting a predetermined list of data suitable to be inputted in at the text input field, wherein the list is associated with the property of the text input field.

4. The computer device of claim 1, further comprising:
an extensive search control arranged for activating a search program interface outside the graphical program interface.

5. A method for inputting data in a computer system, comprising:
providing a graphical program interface at a user-interface of the computer system, wherein the graphical program interface comprises a text input field;
receiving a user selection of the text input field;
providing a graphical selection interface displayed within the graphical program interface upon the user selection of the text input field, wherein the text input field is free from obstruction by the graphical selection interface, the graphical selection interface comprising a select control, a search control, and a results field;
automatically determining at least one predetermined property of the selected text input field;
generating search criteria based on the at least one predetermined property;
searching, with the search control and the search criteria, for the data choices;
displaying the data choices in the results field of the graphical selection interface;
selecting a data choice from the displayed data choices using the select control; and
inputting the data choice at the text input field.

6. A computer program product tangibly embodied in a machine-readable storage device, comprising program code which, when run on a programmable apparatus, performs a method comprising:
providing a graphical program interface at a user-interface of the computer system, wherein the graphical program interface comprises a text input field;
receiving a user selection of the text input field;
providing a graphical selection interface displayed within the graphical program interface upon the user selection of the text input field, wherein the text input field is free from obstruction by the graphical selection interface, the graphical selection interface comprising a select control, a search control, and a results field;
automatically determining at least one predetermined property of the selected text input field;
generating search criteria based on the at least one predetermined property;
searching, with the search control and the search criteria, for the data choices;
displaying the data choices in the results field of the graphical selection interface;
selecting a data choice from the displayed data choices using the select control; and
inputting the data choice at the text input field.

7. An article of manufacture with a computer-usable medium having computer-readable instructions tangibly embodied therein for providing access to resources available on that computer, the computer-readable instructions comprising instructions for causing the computer to perform a method comprising:
providing a graphical program interface at a user-interface of the computer system, wherein the graphical program interface comprises a text input field;
receiving a user selection of the text input field;
providing a graphical selection interface displayed within the graphical program interface upon the user selection of the text input field, wherein the text input field is free from obstruction by the graphical selection interface, the graphical selection interface comprising a select control, a search control, and a results field;
automatically determining at least one predetermined property of the selected text input field;
generating search criteria based on the at least one predetermined property;
searching, with the search control and the search criteria, for the data choices;
displaying the data choices in the results field of the graphical selection interface;
selecting a data choice from the displayed data choices using the select control; and
inputting the data choice at the text input field.

* * * * *